Feb. 6, 1945.  C. J. KROGEL  2,368,763
METHOD OF AND APPARATUS FOR TESTING COVERS ON CORES
Filed July 1, 1942
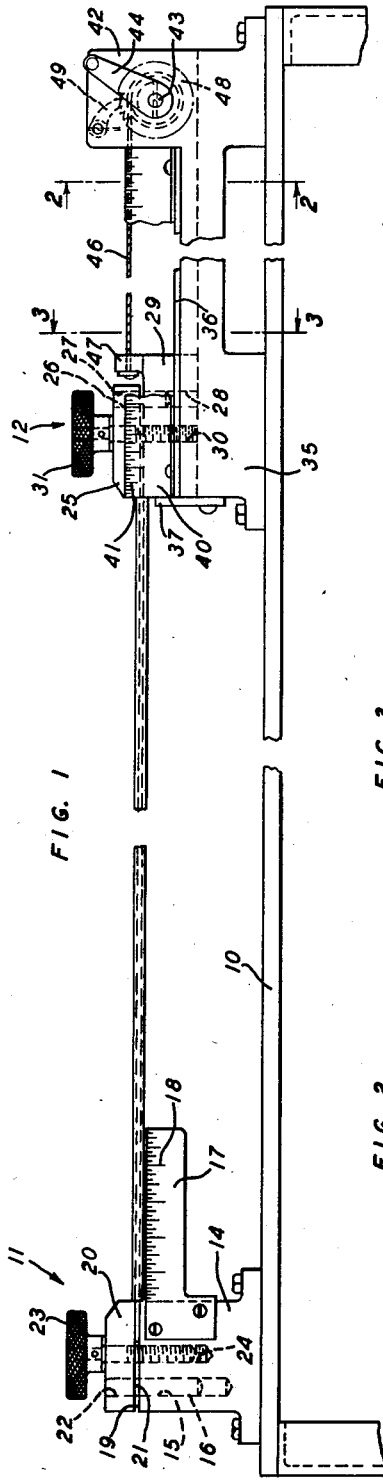
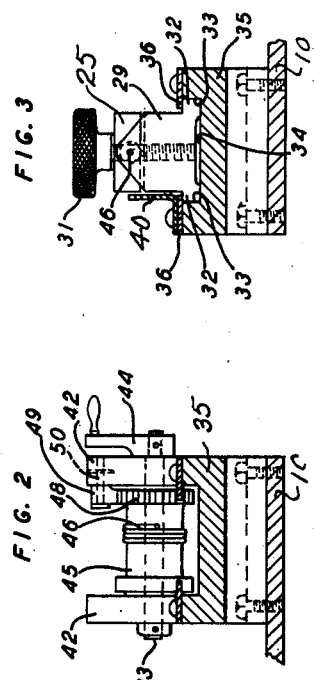
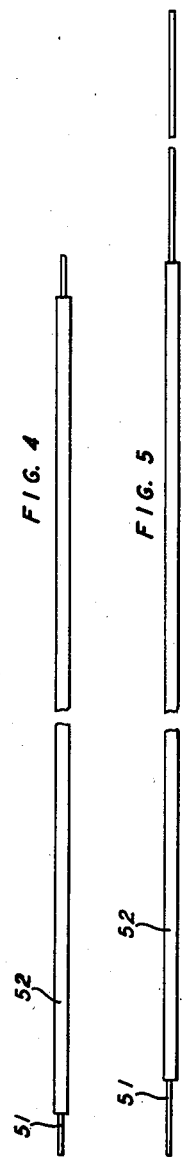
INVENTOR
C. J. KROGEL
BY
E. R. Nowlan
ATTORNEY Patented Feb. 6, 1945

2,368,763

UNITED STATES PATENT OFFICE 2,368,763

METHOD OF AND APPARATUS FOR TESTING COVERS ON CORES

Christopher J. Krogel, Cranford, N. J., assignor to Western Electric Company, Incorporated, New York, N. Y., a corporation of New York Application July 1, 1942, Serial No. 449,284

12 Claims. (Cl. 73—160)

This invention relates to methods of and apparatus for testing covers on cores, and more particularly to methods of and apparatus for testing the tightness of insulating covers on electrical conductors.

In the manufacture of electrical conductors for use in the communication arts, various types of insulating covers are disposed upon the electrical conductors depending upon the particular use to which the conductors are applied, and some of the conductors receive a plurality of successively applied covers of different materials. The latter require advancement of the conductors in some instances through dies of different types and it is important that during the application of one insulating cover to the conductor, that the preceding cover or covers be sufficiently tight upon the conductor to withstand the drag thereon applied in passing through such dies.

Objects of the invention are to provide a simple, efficient and highly practical method of and apparatus for testing the tightness of a covering on a core.

With these and other objects in view, the invention comprises an apparatus by the aid of which the method may be practised for elongating a covered core a measured distance proportional to the original length of the core, and determining the tightness of the cover on the core subsequent to the elongation of the latter.

Other objects and advantages will be apparent from the following detailed description when considered in conjunction with the accompanying drawing, wherein Fig. 1 is a front elevational view of the apparatus by the aid of which the method may be practised;

Fig. 2 is a vertical sectional view taken along the line 2—2 of Fig. 1;

Fig. 3 is a vertical sectional view taken along the line 3—3 of Fig. 1;

Fig. 4 is a view of a covered core prior to the test, and

Fig. 5 is a view of the covered core after the test.

Referring now to Figs. 1 to 3 inclusive, the apparatus comprises a table 10 having a stationary unit, indicated generally at 11, mounted at one end thereof and a movable unit, indicated generally at 12, disposed at the other end thereof. The stationary unit includes a base portion 14 fixedly mounted upon the table 10 and apertured at 15 to receive, by a force fit, a pin 16. A scale 17, graduated as at 18 in fractions of an inch, is mounted upon the base 14 with its upper graduated edge disposed adjacent an upper surface 19 of the base. A clamping jaw 20, having a lower surface 21 parallel with the surface 19 of the base, is provided with an aperture 22 for a sliding vertical movement on the pin 16 and is adapted for movement toward the base by a clamping screw 23, the threaded end of the latter being receivable in a threaded aperture 24 of the base.

Attention is now directed to the movable unit 12, which has a clamping jaw 25 substantially identical in structure to the clamping jaw 20 and is mounted for movement on a pin 26, the latter being receivable in an aperture 27 of the jaw. The pin 26 is rigidly mounted in an aperture 28 of a base member 29, the latter also having a threaded aperture 30 therein to receive the threaded end of a clamping screw 31 serving to force the jaw 25 toward the base for a purpose hereinafter described. As will be observed by viewing Fig. 3, the base 29 has laterally projecting tongue portions 32 slidable in grooves 33 formed by a main groove 34, in a stationary support 35, and the cooperation of plates 36 mounted upon the upper surfaces of the support. Thus the unit 12 is supported for a direct line movement on the support 35. A stop 37 limits the forward movement of the unit, the stop being mounted upon the support 35.

It will be observed that the support 35 is rigidly mounted upon the table 10 and has a scale 40 mounted thereon and extending from the adjacent surface of the stop, which is the normal starting position of the unit 12, to the opposite end or limit of movement of the unit, the scale being provided with graduations 41 representing fractions of an inch. At the farthest or right end of the support 35, vertical projections 42 provide bearings for a shaft 43 upon the forward end of which is mounted a crank 44. Between the projections 42 and mounted upon the shaft 43, is a drum 45 to which is secured one end of a cable 46, the cable being given a number of turns about the drum and extended to an integral vertical portion 47 of the base 29, to which it is secured as illustrated in Fig. 1. The drum 45 has integral ratchet teeth 48 which a pawl 49 is adapted to engage to lock the drum at any desired position, the pawl being pivotally supported on a pin 50 carried by the adjacent projection 42.

Through the aid of this apparatus the method may be practised to test the tightness of a cover on a core. By selecting the covered core 51 illustrated in Fig. 4, the cover 52 being removed from the ends of the core so that these ends of the core may be clamped, leaving the cover free of the clamping means, one end of the core is clamped between the jaw 20 and the base 14 of the stationary unit 11 and is so positioned therein that the adjacent end of the cover is in engagement with the right hand surface of the unit to register with the first marking on the scale 17. The other end of the core may be clamped, as illustrated in Fig. 1, with the bare end of the core between the jaw 25 and the base 29 and the adjacent end of the cover engaging the unit at a position in registration with the end of the scale 40. In other words, a sample covered core is taken from a supply which is to be tested and prepared so that the length of the core under the cover, and naturally the length of the cover, equal the distance between the inner surfaces of the units when in the position shown in Fig. 1, so that the ends of the cover will register with the beginning ends of the scales and relative movement of the units, after the uncovered ends have been clamped in place, will effect elongation of the core which is originally within the cover.

The next step of the method is to cause elongation of the core a predetermined distance, this distance depending upon the length of the covered core and the distance required to determine satisfactorily the tightness of the cover on the core as well as the known percentage of elongation of the material, of which the core is formed, prior to breakage thereof. In the present instance the core is formed of copper and the breakage point of copper upon elongation is approximately twenty-eight per cent (28%). By this it is meant that a given length (one hundred inches) of copper wire elongated twenty-eight per cent (to one hundred twenty-eight inches) will at that point break, that being the extent of elongation of copper before it breaks. However, the important problem for consideration is to determine the tightness of the insulating material on the core in proportion to the degree of elongation to which the core will be subjected in passing through a subsequent step of a covering process.

In the processing of such conductors they are drawn through the necessary parts of the processing machines and if it is known that there will be, for example, a three per cent (3%) elongation of the core in passing through a subsequent covering operation, it is then only necessary to subject the covered core to a test substantially equal or slightly greater than the three per cent (3%) elongation. This may be readily accomplished by the operator rotating the crank 44 with its shaft 43 in a clockwise direction, viewing at the same time the scales 17 and 40 until there appear, between the ends of the cover and the respective ends of the units 11 and 12, uncovered portions of the core of length which equal the desired percentage of the total length of the covered core. For example, if the covered portion of the core under test should be twenty inches in length and the operator wishes to cause an elongation of the core within the cover five per cent (5%), the operator could watch the scales during the rotation of the crank and shaft, resulting in the movement of the unit 12 through the cable 46 until the total elongation illustrated by the bare core portions appearing adjacent the scales equal one inch in length.

At this time the operator may test the cover on the core by attempting to move it. If the cover is free on the core, then it is known that the material tested will not withstand the next processing step. However, if the cover remains tight upon the core it is known that the material from which the sample was taken will withstand the next processing step.

To determine the exact tightness of the cover on the core, the operator may continue the elongation of the core at a reasonably slow speed and simultaneously test the cover until the time when the cover is free on the core. At this time the elongating process may be stopped, the unit 12 being held at that position by the pawl 49 and its ratchet teeth 48, after which the measurements may be taken from the scales 17 and 40, the total of which, when divided by the number of the inches representing the original length of the core, will give the percentage of elongation necessary to free the cover from the core. Therefore, as the tightness of the cover on the core is measured by the percentage of elongation of the core necessary for freeing the cover therefrom, through this method the tightness of the cover on the core may be readily determined through the elongation of the core a given length proportional to the original length of the covered core under test. Furthermore, any percentage of elongation of the covered core, and as the tightness of the cover is determined by the necessary percentage of elongation to loosen it, may be determined through the aid of the method and apparatus.

Although specific improvements of the invention have been shown and described, it will be understood that they are but illustrative and that various modifications may be made therein without departing from the scope and spirit of this invention as defined by the appended claims.

What is claimed is:

1. A method of testing a covered core, the cover thereof adhering to the core, comprising elongating the core, of a covered core of a given length, to a predetermined additional length, and subsequently applying a force to the cover longitudinally of the cover to determine whether or not the cover remains adhered to the core.

2. A method of testing a covered core, the cover thereof adhering to the core, comprising elongating the core, of a covered core of a given length, to a measured additional length, and subsequently applying a force to the cover longitudinally of the cover to determine whether or not the cover remains adhered to the core.

3. A method of testing a covered core, the cover thereof adhering to the core, comprising elongating the core of a covered core of a given length, measuring the amount of elongation of the core during the elongation thereof, stopping the elongation of the core when the core has been elongated to a predetermined length, and subsequently applying a force to the cover longitudinally of the cover to determine whether or not the cover remains adhered to the core.

4. A method of testing a covered core, the cover thereof adhering to the core, comprising elongating the core of a covered core of a given length, measuring the amount of elongation of the core during the elongation thereof, stopping the elongation of the core when the core has been elongated to a predetermined length, holding the core in the elongated position, and subsequently applying a force to the cover longitudinally of the cover to determine whether or not the cover remains adhered to the core.

5. A method of testing a covered core, the cover thereof adhering to the core, comprising elongating the core, of a covered core of a given length, applying a force to the cover longitudinally of the cover during the elongation of the core, continuing the elongation of the core until the cover is free to move thereon, and measuring the amount of elongation of the core necessary to free the cover for movement on the core.

6. A method of testing a covered core, the cover thereof adhering to the core, comprising elongating the core, of a covered core of a given length, applying a force to the cover longitudinally of the cover during the elongation of the core, continuing the elongation of the core until the cover is free to move thereon, holding the core in the elongated position, and measuring the amount of elongation of the core necessary to free the cover for movement on the core.

7. An apparatus for use in testing the tightness of a cover on a covered core, the cover normally adhering to the core, comprising units adapted to grip uncovered ends of a covered core of a given length at the ends of the cover, means to cause relative movement of the units to cause the units to elongate the core within the cover thereof, and means to measure the amount of elongation of the core between the units and the ends of the cover.

8. An apparatus for use in testing the tightness of a cover on a covered core, the cover normally adhering to the core, comprising units adapted to grip uncovered ends of a covered core of a given length at the ends of the cover, means to cause relative movement of the units to cause the units to elongate the core in the cover thereof, means cooperating with the said moving means to cause the units to hold the core at a selected elongated position, and means to measure the amount of elongation of the core between the units and the ends of the cover.

9. An apparatus for use in testing the tightness of a cover on a covered core, the cover normally adhering to the core, comprising units adapted to grip uncovered ends of a covered core of a given length at the ends of the cover, means to cause relative movement of the units to cause the units to elongate the core until the cover is free thereon, and means to measure the amount of elongation of the core between the units and the ends of the cover.

10. An apparatus for use in testing the tightness of a cover on a covered core, the cover normally adhering to the core, comprising units adapted to grip uncovered ends of a covered core of a given length at the ends of the cover, means to cause relative movement of the units to cause the units to elongate the core until the cover is free thereon, means cooperating with the moving means to cause the units to hold the core at the position reached when the cover was freed from the core, and means to measure the amount of elongation of the core between the units and the ends of the cover.

11. An apparatus for use in testing the tightness of a cover on a covered core, the cover normally adhering to the core, comprising units adapted to grip uncovered ends of a covered core of a given length at the ends of the cover, means to support the units at positions spaced a distance equal to the covered portion of the core, means to cause relative movement of the units to cause the units to elongate the covered core, and means adjacent both units to measure the amount of elongation of the core between the units and the ends of the cover.

12. An apparatus for testing a covered core, the cover thereof adhering to the core, comprising units adapted to grip uncovered ends of a covered core of a given length, means to support the units at positions spaced a distance equal to the covered portion of the core, means to cause relative movement of the units to cause the units to elongate the covered core, and individual graduated means adjacent each unit to measure the amount of elongation of the core relative to the cover thereon.

CHRISTOPHER J. KROGEL.